United States Patent
He et al.

(10) Patent No.: US 11,840,783 B2
(45) Date of Patent: Dec. 12, 2023

(54) FULLY DEGRADABLE NON-WOVEN FABRIC PRODUCED BY MELT-BLOW EXTRUSION AND APPLICATION THEREOF IN PRODUCTION OF MEDICAL MASKS

(71) Applicants: CHINA YUNHONG HOLDINGS CO., LTD., Hubei (CN); Yunhong Environmental Technology Co., Ltd., Hubei (CN); Guozhong Xinghe Biomedical Technology Co., Ltd., Hubei (CN)

(72) Inventors: Jingren He, Hubei (CN); Yubao Li, Hubei (CN); Dong Wu, Hubei (CN); Shuxin Ye, Hubei (CN); Sijia Jiang, Hubei (CN); Rui Zhang, Hubei (CN)

(73) Assignees: CHINA YUNHONG HOLDINGS CO., LTD., Huanggang (CN); Yunhong Environmental Technology Co., Ltd., Huanggang (CN); Guozhong Xinghe Biomedical Technology Co., Ltd., Huanggang (CN)

( * ) Notice: Subject to any disclaimer, the term of this patent is extended or adjusted under 35 U.S.C. 154(b) by 17 days.

(21) Appl. No.: 17/507,785

(22) Filed: Oct. 21, 2021

(65) Prior Publication Data
US 2022/0042225 A1    Feb. 10, 2022

(30) Foreign Application Priority Data
Jun. 28, 2021 (CN) .......................... 202110721515.0

(51) Int. Cl.
*H01G 7/02* (2006.01)
*D04H 3/16* (2006.01)
*B29C 48/00* (2019.01)
*D04H 3/011* (2012.01)
*B01D 39/16* (2006.01)

(52) U.S. Cl.
CPC ............ *D04H 3/16* (2013.01); *B01D 39/1623* (2013.01); *B29C 48/022* (2019.02); *D04H 3/011* (2013.01); *H01G 7/023* (2013.01); *B01D 2239/0618* (2013.01); *D10B 2501/042* (2013.01)

(58) Field of Classification Search
CPC ........ B01D 39/1623; B01D 2239/0618; H01G 7/02; H01G 7/023
USPC ............................. 442/400; 55/527; 307/400
See application file for complete search history.

(56) References Cited

U.S. PATENT DOCUMENTS 6,506,873 B1 * 1/2003 Ryan .................. D04H 1/43832
442/364
2015/0056131 A1 * 2/2015 Bernasconi ........... B29C 51/002
424/9.1

FOREIGN PATENT DOCUMENTS

| CN | 110699955 A | 1/2020 |
| CN | 111593484 A | 8/2020 |
| CN | 113308803 A | 8/2021 |

\* cited by examiner

*Primary Examiner* — Leo B Tentoni

(57) ABSTRACT

A fully degradable non-woven fabric produced by melt-blown extrusion and an application thereof in the production of medical masks. The fully degradable non-woven fabric is produced through steps of: (S1) preparation of caprolactone-lactic acid random copolymer; (S2) preparation of copolymerized modified PLA; and (S3) preparation of non-woven fabric by the melt-blown extrusion.

7 Claims, No Drawings

FULLY DEGRADABLE NON-WOVEN FABRIC PRODUCED BY MELT-BLOW EXTRUSION AND APPLICATION THEREOF IN PRODUCTION OF MEDICAL MASKS

CROSS-REFERENCE TO RELATED APPLICATIONS

This application claims the benefit of priority from Chinese Patent Application No. 202110721515.0, filed on Jun. 28, 2021. The content of the aforementioned application, including any intervening amendments thereto, is incorporated herein by reference in its entirety.

TECHNICAL FIELD

This application relates to non-woven fabrics, in particular to a fully degradable non-woven fabric produced by a melt-blown extrusion and an application thereof in the production of medical masks.

BACKGROUND

Non-woven fabric is composed of directional or random fibers, and is considered to be a new generation of environmentally-friendly materials. It is breathable and thin, flexible, non-combustible, non-toxic and non-irritating, and has a low cost.

The melt-blown extrusion is a process for manufacturing a non-woven fabric directly from a polymer, in which the high-speed and high-temperature air blowing is employed to gradually solidify a polymer melt trickle to further obtain ultra-fine fibers. This process has been widely used in the manufacturing process of non-woven fabrics.

Unfortunately, the existing melt-blown non-woven fabrics will cause environmental pollution due to the use of non-degradable polypropylene as raw material. In this regard, several solutions have been proposed in the prior art to prepare a melt-blown non-woven fabric from degradable materials. Chinese patent application No. 202011528027.X, discloses a degradable melt-blown non-woven fabric for masks", but it only mentions the composition of the non-woven fabric, and does not provide a specific process for preparing the raw material into a non-woven fabric using the melt-blown method. Therefore, whether the raw material can be processed into masks by melt-blown method still remains undetermined.

SUMMARY

The purpose of the present disclosure is to provide a fully degradable non-woven fabric produced by melt-blown extrusion and an application thereof in the production of medical masks, where the non-woven fabric is prepared from polylactic acid (PLA) which undergoes multiple gradient modifications and other degradable materials through the melt-blown extrusion. The non-woven fabric of the present disclosure has excellent performances, and can be completely degraded without causing environmental pollution.

The technical solutions of the present disclosure are described as follows.

In a first aspect, the disclosure provides a fully degradable non-woven fabric produced by melt-blown extrusion, wherein the fully degradable non-woven fabric is manufactured through steps of:

(S1) adding lactic acid (L-LA) and ε-caprolactone (ε-CL) into a reaction vessel to obtain a reaction system, wherein a weight ratio of the lactic acid (L-LA) to the ε-caprolactone (ε-CL) in the reaction system is 1:(2-4), preferably 1:3;

adding a catalyst to the reaction system followed by reaction at 130-140° C. under vacuum for 18-24 hours to obtain a crude copolymerization product; wherein the catalyst is 0.1-0.2% of a total weight of the reaction system, and the catalyst preferably includes a N,N donor zinc guanidine catalyst; and purifying the crude copolymerization product followed by drying at 40-50° C. in a vacuum drying oven to obtain a caprolactone-lactic acid random copolymer P (CL-co-LA);

(S2) drying polylactic acid (PLA);

mixing a dried PLA and the P(CL-co-LA) uniformly followed by melt blending at a temperature of 180-190° C. and a rotation speed of 50-100 r/min to obtain a blend; wherein a weigh ratio of PLA to P (CL-co-LA) is (9-99):1, and the melt blending is performed for 5-10 min, preferably 8 min; and subjecting the blend to compression molding at 180-190° C. and 8-10 MPa to obtain a copolymerized modified PLA; and (S3) subjecting the copolymerized modified PLA, poly (3-hydroxybutyrate-co-3-hydroxyvalerat) (PHBV), nano $SiO_2$, a compatibilizer, and a chain extender to blending obtain a melt-blown blend; wherein a weight ratio of the copolymerized modified PLA to the PHBV to the nano $SiO_2$ to the compatibilizer to the chain extender is (80-90):(1-3):(0.2-0.3):(0.005-0.01):(0.001-0.005); and the copolymerized modified PLA is sliced and dried at 60° C. for 24-48 hours to reduce a water content to less than 0.025% before blending;

feeding the melt-blown blend to a screw extruder followed by melt-extrusion and pelletization at 160-200° C. to obtain a blend pellet; and feeding the blended pellet to the screw extruder followed by melt-extrusion and plasticization to obtain a melt-extrusion product; accurately metering and transporting, by a metering pump, the melt-extrusion product to a spinneret assembly, and ejecting the melt-extrusion product from a hole of a spinneret of the spinneret assembly followed by cooling and pulling using high speed and high pressure hot air flow to form a melt-blown non-woven material on a collecting device (such as receiving plate); and subjecting the melt-blown non-woven material to electret treatment, trimming, winding and forming to obtain the fully degradable non-woven fabric.

In an embodiment, in the step (S1), the crude copolymerization product is purified through steps of:

(S11) subjecting the crude copolymerization product to ultrasonic treatment and/or microwave treatment followed by precipitation with ethanol with a volume fraction of 90%; and (S12) repeating the step (S11) 1-2 times to obtain a purified copolymerization product.

In an embodiment, the ultrasonic treatment is performed at an ultrasonic power of 200-300 W for 1-1.5 h; and the microwave treatment is performed at a microwave power of 200-300 W for 0.5-1 h.

In an embodiment, in the step (S3), the compatibilizer is selected from the group consisting of maleic anhydride, butyric anhydride, stearic anhydride, tannic acid and a combination thereof.

In an embodiment, the compatibilizer is a combination of maleic anhydride, butyric anhydride, stearic anhydride and tannic acid in a weight ratio of 1:2:2:1.

In an embodiment, in the step (S3), the chain extender is a multi-functional epoxy chain extender (ADR chain extender).

In an embodiment, in the step (S3), a distance from the hole of the spinneret of the spinneret assembly to the collecting device is 30-50 cm.

In an embodiment, an extrusion frequency of the hole of the spinneret is 1.5 Hz-2.5 Hz.

In an embodiment, a temperature of the high speed and high pressure hot air flow is 240-260° C.

In an embodiment, in the step (S2), a melt index of the PLA at 210° C. is 20-40 g/10 min.

In an embodiment, in the step (S3), an electret material used in the electret treatment is obtained by corona electret; and the electret treatment is performed at an electret voltage of 30-40 kV and an electret distance of 2-4 cm for 1-2 min.

In a second aspect, the present disclosure also provides an application of the fully degradable non-woven fabric in the manufacturing of a medical mask.

Compared to the prior art, the disclosure has the following beneficial effects.

In this application, the raw materials of the non-woven fabric are all fully degradable, so that the non-woven fabric will not pollute the environment after used. Moreover, the raw material PLA undergoes multiple gradient modifications before used in the manufacturing of the non-woven fabric, and specifically, the PLA is subjected to blending modification first, and then subjected to blending modification and chain extension modification to change the structure, thereby changing the properties of the PLA. The introduction of the ultrasonic/microwave treatment and the electret treatment during the modification process, as well as the optimization of various melt-blown parameters, significantly enhances the performance of the non-woven fabric.

DETAILED DESCRIPTION OF EXAMPLES

In order to make objectives, technical solutions, and advantages of the present disclosure clearer, the present disclosure will be further described below with reference to the embodiments.

Example 1

Provided herein is a fully degradable non-woven fabric produced by a melt-blown extrusion, which is manufactured through the following steps.

(S1) Preparation of Caprolactone-Lactic Acid Random Copolymer P(CL-Co-LA)

Adding lactic acid (L-LA) and ε-caprolactone (ε-CL) into a reaction vessel to obtain a reaction system, where a weight ratio of the lactic acid (L-LA) to the ε-caprolactone (ε-CL) in the reaction system is 1:(2-4), preferably 1:3.

Adding a catalyst to the reaction system followed by reaction at 130-140° C. under vacuum for 18-24 hours to obtain a crude copolymerization product; where the catalyst is 0.1-0.2% of a total weight of the reaction system, and the catalyst preferably includes a N,N donor zinc guanidine catalyst, which has advantages of non-toxicity and a simple synthesis method. Compared with a common catalyst in a production of polylactic acid—stannous octoate, a N, N donor zinc guanidine catalyst has a better ultra-high polymer activity and a faster catalytic reaction rate. A polymer produced has a better material stability and a high molecular weight.

Purifying the crude copolymerization product followed by drying at 40-50° C., preferably 45° C., in a vacuum drying oven to obtain the caprolactone-lactic acid random copolymer P (CL-co-LA). In which, a step of purifying the crude copolymerization product includes:

(S11) subjecting the crude copolymerization product to ultrasonic treatment and/or microwave treatment followed by precipitating with ethanol with a volume fraction of 90%; and (S12) repeating the step (S11) 1-2 times to obtain a purified copolymerizayion product.

In an embodiment, the ultrasonic treatment is performed at an ultrasonic power of 200-300 W for 1-1.5 h; and the microwave treatment is performed at a microwave power of 200-300 W for 0.5-1 h. Therefore, a melt flow ability of polylactic acid (PLA) is improved by the copolymerization modification of the step (S1).

(S2) Preparation of Copolymerized Modified PLA

Drying polylactic acid (PLA), a melt index of the PLA at 210° C. is 20-40 g/10 min.

Mixing a dried PLA and the (P(CL-co-LA)) uniformly followed by melt blending at a temperature of 180-190° C. and a rotation speed of 50-100 r/min to obtain a blend, in which, a weigh ratio of PLA to P (CL-co-LA) is (9-99):1, and the melt blending is performed for 5-10 min.

The blend is subjected to compression molding at 180-190° C. and 8-10 MPa to obtain the copolymerized modified PLA.

(S3) Preparation of Non-Woven Fabric by Melt-Blown Extrusion

Subjecting the copolymerized modified PLA, poly(3-hydroxybutyrate-co-3-hydroxyvalerat) (PHBV), nano $SiO_2$, a compatibilizer, and a chain extender to blending obtain a melt-blown blend; in which a weight ratio of the copolymerized modified PLA to the PHBV to the nano $SiO_2$ to the compatibilizer to the chain extender is (80-95):(1-5):(0.1-0.2):(0.001-0.005):(0.001-0.01); and the copolymerized modified PLA is sliced and dried at 60° C. for 24-48 hours to reduce a water content to less than 0.025% before blending. The compatibilizer is selected from the group consisting of maleic anhydride, butyric anhydride, stearic anhydride, tannic acid and a combination thereof. Preferably, the compatibilizer is a combination of maleic anhydride, butyric anhydride, stearic anhydride, and tannic acid; in a weight ratio of 1:1:1:1. The chain extender is a multi-functional epoxy chain extender (ADR chain extender).

Feeding the melt-blown blend to a screw extruder followed by melt-extrusion pelletization at 160-200° C. to obtain a blended pellet.

Feeding the blended pellet to the screw extruder followed by melt-extrusion and plasticization to obtain a melt-extrusion product; accurately metering and transporting, by a metering pump, the melt-extrusion product to a spinneret assembly, and ejecting the melt-extrusion product from a hole of a spinneret of the spinneret assembly followed by cooling and pulling using high speed and high pressure hot air flow to form a melt-blown non-woven material on a collecting device (such as receiving plate), and subjecting the melt-blown non-woven material to electret treatment, trimming, winding and forming to obtain the fully degradable non-woven fabric. A distance from the hole of the spinneret of the spinneret assembly to the collecting device is 30-50 cm. An extrusion frequency of the hole of the spinneret is 1.5 Hz-2.5 Hz. A temperature of the hot air flow is 240-260° C. An electret material used in the electret treatment is obtained by corona electret. And the electret treatment is performed at an electret voltage of 30-40 kV and an electret distance of 2-4 cm for 1-2 min.

In the step (S1) of this example, the crude copolymerization product may be subjected to ultrasonic treatment and/or microwave treatment for auxiliary purification, thereby increasing the yield of a copolymerized modified product, that is, P(CL-co-LA). In the following, auxiliary purification steps of the crude copolymerization product are optimized by setting different purification methods and conditions of the crude copolymerization product. Specific settings are shown in Table 1.

TABLE 1

Influence of assisted purification conditions on the yield of P(CL-co-LA)

| Assisted purification conditions | Average yield of P(CL-co-LA) (%) |
| --- | --- |
| — | 81% |
| Ultrasonic treatment (a power of 300 W, treatment time of 1 h) | 92% |
| Microwave treatment (a power of 250 W, treatment time of 1 h) | 85% |
| Ultrasonic treatment + Microwave treatment | 95% |

Note:
"—" mean that the crude copolymerization product is not subjected to any auxiliary purification treatment, and the crude copolymerization product is directly used as P (CL-co-LA).

It can be seen from Table 1 that when no auxiliary purification method is used, the average yield of the caprolactone-lactic acid random copolymer P(CL-co-LA) is only about 81%. Ultrasonic treatment or microwave treatment can improve the yield of the product to a certain extent, and the product yield is the highest after the two are treated together. Therefore, in the step (S11), the crude copolymerization product is preferably subjected to the ultrasonic treatment and the microwave treatment, and the ultrasonic treatment is performed at an ultrasonic power of 300 W for 1 h; and the microwave treatment is performed at a microwave power of 250 W for 1 h.

Further, this example also optimizes a weight ratio of PLA to P (CL-co-LA) in the step (S2) (i.e., PLA/P (CL-co-LA)), thereby discussing an effect of the weight ratio on a tensile strength and a glass transition temperature of the copolymerized modified PLA to obtain the copolymerized modified PLA with best performance. Table 2 shows optimized settings. In which, a tensile strength test of copolymerized modified PLA is carried out according to the method of GB/T 1040-2006 testing tensile strength, and a tensile rate is 10 mm/min. For a test of the glass transition temperature of copolymerized modified PLA, the DMA test is adopted. A method is to adopt a film stretching mode, a frequency is 1 Hz, a heating rate is 3° C./min, and an amplitude is 15 μm.

TABLE 2

Influence of PLA/P (CL-co-LA) on copolymerized modified PLA

| PLA/P (CL-co-LA) | Tensile strength (MPa) | Glass transition temperature (° C.) |
| --- | --- | --- |
| 100/0 | 61 | 81 |
| 99/1 | 73 | 65 |

TABLE 2-continued

Influence of PLA/P (CL-co-LA) on copolymerized modified PLA

| PLA/P (CL-co-LA) | Tensile strength (MPa) | Glass transition temperature (° C.) |
| --- | --- | --- |
| 97/3 | 66 | 72 |
| 95/5 | 60 | 73 |
| 90/10 | 51 | 81 |

It can be seen from Table 2 that as a content of P(CL-co-LA) increases, a tensile strength of the blend increases first and then decreases. When a weight fraction of P (CL-co-LA) is less (1%), P (CL-co-LA) is evenly dispersed between PLA molecular chains, occupying the gaps between the PLA molecular chains, and the molecular chains are packed more tightly. Therefore, the tensile strength of the copolymerized modified PLA is improved. When the addition amount of P(CL-co-LA) continues to increase, P(CL-co-LA) will merge and a plasticization will play a leading role at this time. Therefore, the tensile strength of copolymerized modified PLA decreases with the increase of addition of P (CL-co-LA). After testing the copolymerized modified PLA with DMA, it is found that the glass transition temperature first decreases and then increases. When a weight ratio of copolymerized modified PLA to P (CL-co-LA) is 99/1, the glass transition temperature is the lowest, indicating a small amount addition of P (CL-co-LA) can play a role of internal lubrication and lower the glass transition temperature. This result is consistent with the stretching result. In summary, in the step (S2), PLA and P (CL-co-LA) are mixed uniformly according to the weight ratio of 99:1.

In an example, in the step (S3), since the PLA molecule contains hydrophilic ester groups with a water content of 0.4%-0.6%, molten PLA degrades very quickly under the presence of water, which further leads to a decrease in the molecular weight and widening in a molecular weight distribution of PLA, resulting in molecular weight and a distribution of the molecular weight that are not suitable for spinning requirements. On the other hand, a polymer fluid channel is closed during a melt spinning process. When the polymer is melted by heat, the presence of moisture will not only affect a viscosity and an extrusion state of the fluid of the polymer after melting, but also may form many tiny bubbles in the polymer. The bubbles may cause wire breakage during a stretching process, and cause extremely adverse effects on mechanical properties and a diameter of a fiber of a product.

The moisture content, drying time, and drying temperature of a slice are main factors affecting the thermal degradation of PLA. The moisture content of the slice is higher, a degree of degradation is greater and a degradation rate is faster; the drying time is longer, the degree of degradation is greater; the drying temperature is higher, the degradation rate is faster, the degree of degradation is greater. Therefore, in the step (S3), the copolymerized modified PLA must be dried before blending to reduce a water content of the copolymerized modified PLA. Table 3 shows the optimal setting mode of the slicing and drying conditions for the copolymerized modified PLA when the drying temperature is 60° C.

TABLE 3

Influence of drying time at 60° C. on the water content of the slice of the copolymerized modified PLA

| Drying time (h) | Average water content of the slice of the copolymerized modified PLA |
|---|---|
| 12 | 0.135% |
| 24 | 0.073% |
| 36 | 0.057% |
| 48 | 0.015% |

Therefore, in the step (S3), it is preferable to dry the slice of the copolymerized modified PLA at 60° C. for 48 hours to reduce a water content of the slice of the copolymerized modified PLA to 0.025% while avoiding thermal degradation.

At the same time, in the step (S3), the copolymerized modified PLA, the PHBV (copolymer of 3-hydroxybutyrate and 3-hydroxyvalerate), the nano $SiO_2$, the compatibilizer, and the chain extender are blended to perform a blending modification and a chain extending modification. In the process of further obtaining melt-blown blends, this example also optimizes proportions of components to investigate how it affects properties of the final fully degradable non-woven fabric. In which, Table 4 shows the effect of a weight ratio of copolymerized modified PLA and PHBV on the performance of the fully degradable non-woven fabric.

TABLE 4

Weight ratio of copolymerized modified PLA/PHBV/ compatibility agent/chain extender/$SiO_2$

| Number | Copolymerized modified PLA | PHBV | Compatibilizer | Chain extender | Nano $SiO_2$ |
|---|---|---|---|---|---|
| 1 | 100 | — | — | — | — |
| 2 | 95 | 5 | 0.005 | 0.01 | 0.2 |
| 3 | 90 | 4 | 0.005 | 0.01 | 0.2 |
| 4 | 85 | 3 | 0.005 | 0.01 | 0.2 |
| 5 | 80 | 1 | 0.005 | 0.01 | 0.2 |

On this basis, A YG028-500 strength tester is used to test mechanical properties of the finally obtained fully degradable non-woven fabric. The results are shown in Table 5.

TABLE 5

Influence of the weight ratio of copolymerized modified PLA to PHBV on the mechanical properties of fully degradable non-woven fabric

| Samples | Longitudinal strength (N) | Transverse strength (N) | Longitudinal elongation (%) | Transverse elongation (%) |
|---|---|---|---|---|
| 1 | 12.04 | 7.61 | 15.08 | 17.40 |
| 2 | 11.78 | 7.54 | 27.16 | 32.78 |
| 3 | 11.54 | 7.53 | 45.44 | 47.57 |
| 4 | 11.24 | 7.14 | 51.27 | 49.48 |
| 5 | 10.24 | 6.98 | 67.15 | 61.28 |

In the process of mixing, extrusion, injection molding, spinning, etc., due to the effect of heat, moisture and impurities, the macro-molecular chain of PLA will be broken, which will cause the performance of the material to decrease, and active end groups (end carboxyl groups and end hydroxyl groups) are generated at breaks of the PLA molecular chain. The chain extender relies on its own active epoxy groups to produce coupling and branching reactions with the active end groups generated at the molecular chain breaks, thereby increasing the length of the molecular chain to obtain more long chain branches, and to increase the processing stability of PLA.

It can be seen from Table 5 that with the addition of PHBV, a transverse strength and a longitudinal strength of the fully degradable non-woven fabric decrease slightly, but the longitudinal elongation and transverse elongation are greatly increased, indicating that PHBV and copolymerization modification PLA blending can give play to their performance advantages. At the same time, adding a small amount of nano $SiO_2$ with good dispersibility can play a good role in strengthening and toughening. From the view point of micro-mechanics, it can evenly disperse rigid nanoparticles in polymer. When the polymer is subjected to external force, a stress concentration effect is generated due to the presence of the rigid inorganic particles, which easily stimulates the surrounding polymer to produce micro-cracks (or silver streaks), absorbing a certain deformation work. At the same time, the polymer between the particles yields also produces yield and plastic deformation, absorbing impact energy. In addition, the existence of rigid particles hinders and passivates the crack propagation of the polymer, and eventually stops and does not develop into destructive cracking, resulting in the effect of strengthening and toughening. In summary, in the melt-blown blend of the step (S3), a weight ratio of copolymerized modified PLA to PHBV is preferably 80:1.

In an example, under the premise of copolymerized modified PLA:the PHBV:the nano $SiO_2$:the chain extender=80:1:0.2:0.01, the influence of different compatibilizer composition on the mechanical properties of the fully degradable non-woven fabric is investigated, and the testing process of the mechanical properties of the fully degradable non-woven fabric is the same as above, and the results are shown in Table 6.

TABLE 6

Influence of compatibilizer composition on the mechanical properties of fully degradable non-woven fabric

| The type of compatibilizer | Longitudinal strength (N) | Transverse strength (N) | Longitudinal elongation (%) | Transverse elongation (%) |
|---|---|---|---|---|
| Maleic anhydride | 10.24 | 6.98 | 67.15 | 61.28 |
| Maleic anhydride: butyric anhydride: = 1:1 | 10.78 | 7.12 | 68.43 | 62.14 |
| Maleic anhydride: butyric anhydride: stearic anhydride = 1:1:1 | 11.98 | 7.43 | 68.75 | 63.26 |
| Maleic anhydride: butyric anhydride: stearic anhydride: tannic acid = 1:1:1:1 | 12.07 | 7.54 | 69.81 | 64.71 |

Most of the compatibilizers contain polar groups, which can undergo an esterification reaction or form hydrogen bonds with the polar groups in a filler, thereby reducing the polarity and hygroscopicity of the filler. And the compatibilizer also contains non-polar segments with good compatibility with a polymer, the non-polar segments act like a "bridge" to effectively bond the filler and the polymer together and improve the interfacial bonding performance of the filler and the polymer. It can be seen from Table 6 that an optimal compatibilizer ratio is, in a weight ratio, maleic anhydride:butyric anhydride:stearic anhydride:tannic acid=1:1:1:1. Under the conditions, the longitudinal strength, the transverse strength, the longitudinal elongation, and the transverse elongation of the fully degradable non-woven fabric are all maximum.

It can be analyzed from Table 4-6 that the tensile strength and modulus of PHBV are low. PLA has the characteristics of high strength and high modulus, but due to its inherent brittleness, a low elongation at break, a low impact strength, and extremely easy to bend and deform. Therefore, after blending the PHBV and the copolymerized modified PLA, a toughness of the non-woven fabric can be improved while maintaining the degradation performance of a material. At the same time, in order to further increase a two-phase structure of the blends of the copolymerized modified PLA and the PHBV, a compatibilizer (selected from a group consisting of maleic anhydride, butyric anhydride, stearic anhydride, and tannic acid) is added to the PLA/PHBV blend system. So that the copolymerized modified PLA and the PHBV can be better blended and give play to their performance advantages. In addition, PLA is a crystalline polymer with few long branches in the molecular chain and low degree of branching. The PLA melt is sensitive to temperature, and thermal oxidative degradation or hydrolysis is prone to occur during processing to cause a rupture of the molecular chain. All of these factors lead to a low melt viscosity and a low melt strength of PLA, a poor melt viscoelasticity, and an insufficient strain hardening, which limits the processing technology of PLA. Therefore, on the one hand, a relative molecular weight of PLA can be increased by adding chain extenders. On the other hand, a long-chain branched structure is introduced into the PLA molecule to increase the melt strength of the PLA, which in turn improves the processing properties of PLA, such as film blowing, blow molding, and foaming.

In addition, under the premise of the copolymerized modified PLA:the PHBV:the nano $SiO_2$:the compatibilizer: the chain extender=80:1:0.2:0.003:0.01, this example also optimizes melt-blown related parameters, including the receiving distance from the hole of the spinneret of the spinneret assembly to the collecting device (that is the "receiving distance"), a extrusion frequency of the hole of the spinneret (that is a "extrusion frequency"), a temperature of a hot air flow (that is a "hot air temperature"), Table 7 shows specific setting methods to investigate an influence on a performance of a melt-blown product.

TABLE 7

Optimal setting method of the receiving distance,
the extrusion frequency and the hot air temperature

| Experimental parameters | Receiving distance (cm) | Hot air temperature (° C.) | Extrusion frequency (Hz) |
| --- | --- | --- | --- |
| Receiving distance | 30 | 250 | 2 |
| | 40 | 250 | 2 |
| | 50 | 250 | 2 |
| Hot air temperature | 40 | 240 | 2 |
| | 40 | 250 | 2 |
| | 40 | 260 | 2 |
| Extrusion frequency | 40 | 250 | 1.5 |
| | 40 | 250 | 2 |
| | 40 | 250 | 2.5 |

On the basis of Table 7, the influence of the different receiving distance, hot air temperature, and extrusion frequency on a diameter of a melt-blown fiber is investigated.

Fiber diameter test: the size and distribution of fiber diameter directly affect a pore size and a pore size distribution of the non-woven fabric, thereby affecting the filtration performance (filtration efficiency and filtration resistance) of the material. It is difficult to measure a diameter of the fiber directly. In this application, Smile-view software is used to measure the diameter of the fiber taken by the scanning electron microscope of the non-woven fabric to obtain the size and distribution of the fiber diameter. First, the fiber diameter at 50 different positions in each sample is measured, and an average value is taken to reduce the test error.

The Influence of Receiving Distance on Diameter of a Melt-Blown Non-Woven Fiber

Table 8 shows parameter setting methods and test results.

TABLE 8

The influence of different receiving
distances on the diameter of the
melt-blown non-woven fiber

| Receiving distance (cm) | Average diameter (μm) | CV value (%) |
| --- | --- | --- |
| 30 | 2.4 | 27.9 |
| 40 | 1.2 | 26.4 |
| 50 | 1.0 | 21.6 |

In the step (S3), the non-woven fiber produced by the melt-blown method presents a three-dimensional cross distribution. It can be seen from Table 8 that the larger the receiving distance, the smaller the fiber diameter. When the receiving distance increases from 30 cm to 50 cm, the average fiber diameter is reduced from 2.4 μm to 1.0 μm. The main reason is that when the receiving distance is small, the fiber cannot be effectively drafted, and sufficient cooling is not obtained, the degree of fiber entanglement increases, and the phenomenon of twining occurs. While increases the receiving distance, the longer the drafting time of the fiber from the spinneret to the condensing drum, the weaker the bonding force between the fiber and the fiber, the sufficient drafting and cooling of the fiber, the reduction of fiber fineness and the reduction of the phenomenon of twining. In comprehensive consideration, in the step (S3), the receiving distance from the hole of the spinneret of the spinneret assembly to the collecting device is preferably 40-50 cm.

The Effect of the Hot Air Temperature on the Diameter of the Melt-Blown Non-Woven Fiber Table 9 shows parameter setting methods and test results.

TABLE 9

The influence of the different hot air
temperature on the diameter of the
melt-blown non-woven fabric fiber

| Hot air temperature (° C.) | Average diameter (μm) | CV value (%) |
| --- | --- | --- |
| 240 | 2.5 | 26.9 |
| 250 | 1.2 | 26.4 |
| 260 | 1.9 | 28.9 |

In the process of melt-blowing, in order to avoid the rapid decrease in the temperature of the fiber after being ejected from the spinneret, the fiber cannot be further pulled, the setting of hot air temperature is generally slightly higher than the temperature of spinneret. It can be seen from Table 9 that the overall fiber diameter of the fiber is larger when the hot air temperature is 240° C., while the fiber diameter at 250° C. and 260° C. is relatively small, and there is a trend of first decreasing and then increasing. On the one hand, an appropriate increase in the temperature of the hot air can extend the cooling time of the fiber in the air, which is conducive to better pulling; on the other hand, as the temperature rises, the viscosity of the melt gradually decreases and the fluidity is better. It is easier to be pulled and thinned, so the diameter of the fiber will decrease accordingly. When the temperature of the hot air continues to rise, although the pulling effect reduces the fineness of the single fiber, the molecular chain of the fiber becomes more active at this time, and the fiber is twined during the pulling process, resulting in a slight increase of the average diameter of the fiber. In comprehensive consideration, in the step (S3), the temperature of the hot air flow is preferably 250° C.

The Effect of the Extrusion Frequency on the Fiber Diameter of the Melt-Blown Non-Woven Fabric Table 10 shows parameter setting methods and test results.

TABLE 10

The influence of different extrusion frequencies on the diameter of the melt-blown non-woven fiber

| Extrusion frequency (Hz) | Average diameter (μm) | CV value (%) |
| --- | --- | --- |
| 1.5 | 1.1 | 25.8 |
| 2 | 1.2 | 26.4 |
| 2.5 | 2.1 | 33.1 |

It can be seen from Table 10 that when the extrusion frequency is 2.5 Hz, the fiber diameter is larger and the distribution is uneven, mainly because the increase in the extrusion frequency increases the amount of fiber ejected from the spinneret, and the pulling of the fiber during the pulling process is not uniform enough, resulting in a serious differentiation of fineness of the fiber. When the extrusion frequency increases from 1.5 Hz to 2.5 Hz, the fiber diameter increases from 1.1 μm to 2.1 The main reason is that when the extrusion frequency increases, the amount of melt stored in the extruder in per unit time increases, and the melt is not completely melted in the extruder, resulting in an increase in diameter of the fiber. Considering comprehensively, in the step (S3), the extrusion frequency of the hole of the spinneret is preferably 1.5-2 Hz.

On the basis of Table 7, the influence of the different receiving distance, hot air temperature, and extrusion frequency on the air permeability, the average pore size and a thickness of the fully degradable non-woven fabric obtained by melt-blown method is investigated. In which, the relevant test can be carried out according to the standard of GB/T 24218.15-2018 and GB/T 24218.2-2009.

Table 11 shows the influence of the different receiving distance, hot air temperature, and extrusion frequency on the air permeability and average pore diameter of the fully degradable non-woven fabric obtained by melt-blown method.

TABLE 11

The influence of the receiving distance, the hot air temperature, and the extrusion frequency on the air permeability and the average pore diameter of the fully degradable non-woven fabric

| Experimental parameters | Receiving distance (cm) | Air permeability (mm/s) | Average pore diameter (μm) |
| --- | --- | --- | --- |
| Receiving distance | 30 | 897.1 | 12.6 |
|  | 40 | 979.2 | 10.9 |
|  | 50 | 1184.7 | 10.4 |
| Hot air temperature | 240 | 911.2 | 15.4 |
|  | 250 | 979.2 | 10.9 |
|  | 260 | 1056.7 | 12.1 |
| Extrusion frequency | 1.5 | 841.7 | 10.2 |
|  | 2 | 979.2 | 10.9 |
|  | 2.5 | 997.7 | 12.8 |

When using the non-woven fabric to prepare disposable masks, the masks are required to have good air permeability. It can be seen from Table 11 that no matter what the conditions are, the non-woven fabric finally obtained has a larger air permeability and a smaller average pore size.

Table 12 shows the influence of the different receiving distance, hot air temperature, and extrusion frequency on the thickness of the fully degradable non-woven fabric obtained by melt-blown method.

TABLE 12

Influence of the receiving distance, the hot air temperature, and the extrusion frequency on the thickness of the fully degradable non-woven fabric

| Experimental parameters | Receiving distance (cm) | Thickness (mm) | CV value (%) |
| --- | --- | --- | --- |
| Receiving distance | 30 | 1.04 | 3.78 |
|  | 40 | 1.29 | 1.24 |
|  | 50 | 1.91 | 2.91 |
| Hot air temperature | 240 | 1.28 | 3.24 |
|  | 250 | 1.29 | 1.24 |
|  | 260 | 1.30 | 3.78 |
| Extrusion frequency | 1.5 | 1.27 | 2.27 |
|  | 2 | 1.29 | 1.24 |
|  | 2.5 | 1.42 | 2.28 |

It can be seen from Table 12 that the thickness of the non-woven fabric increases with the increase of the receiving distance, which is mainly related to the fiber diameter and the bulkiness of the fiber web. As the temperature of the hot air increases, the thickness of the non-woven fabric increases slightly. The reason is that when the temperature is low, a bonding between the fibers is strong, a fiber network structure is dense, a thickness is small, and the temperature rises, and the bonding between the fibers get weak, the fiber web structure is fluffy and the thickness is large. As the extrusion frequency increases, the thickness of the non-woven fabric increases. The reason is that the increase in the extrusion frequency makes the fiber bonding worse, the fiber web is fluffy, and the thickness increases.

In an example, the filtration efficiency of the non-woven fabric can be improved by electret treatment. Therefore, this example also investigates the influence of the electret treatment conditions on the filtration performance of the non-woven fabric. Three experimental groups are set up to prepare fully degradable non-woven fabric with reference to the melt-blown method in this example, the difference is that in the melt-blown blends corresponding to experimental group 1, experimental group 2 and experimental group 3, ratios of the copolymerization modified PLA:the PHBV:the nano $SiO_2$:the compatibilizer:the chain extender are 80:1:0: 0.003:0.01, 80:1:0.1:0.003:0.01, and 80:1:0.2:0.003:0.01 respectively. Each experimental group is in the process of producing the fully degradable non-woven fabric, in the step (S3), a part of the melt-blown non-woven material is taken for electret treatment, and a remaining part is not subjected to electret treatment. The electret treatment conditions are set as follows: electret voltage 40 kV, electret distance 3 cm, electret time 1 min, other remaining conditions are the same.

The YG401 fabric induction electrostatic tester is used to test the electrostatic potential of the surface of the fully degradable non-woven fabric finally obtained in each experimental group. During the test, the number of samples of the non-woven fabric obtained without electret treatment and the non-woven fabric obtained after electret treatment is 5, a distance between a probe and the test sample is 15 mm, a rotating speed of a turntable is 1500 rpm, and test results are shown in Table 13.

TABLE 13

Filtering performance of the fully degradable non-woven fabric

| Group | Non-electret resistance (Pa) | Non-electret filtration efficiency (%) | Electret resistance (Pa) | Electret filtration efficiency (%) | 30-Day resistance (Pa) | 30-Day efficiency (%) |
|---|---|---|---|---|---|---|
| Experimental group 1 | 18 | 38% | 18 | 92% | 18 | 90% |
| Experimental group 2 | 19 | 41% | 19 | 91% | 19 | 91% |
| Experimental group 3 | 20 | 40% | 20 | 93% | 20 | 92% |

It can be seen from Table 13, after testing, the filtration efficiency of the non-woven fabric obtained without electret treatment is only about 40%, while the filtration efficiency of the non-woven fabric obtained after electret treatment can reach more than 90%. It can be seen that after the electret treatment, the surface charge of the melt-blown fiber web increases, which significantly improves the filtration efficiency. At the same time, it can be seen from the test results that the filtration performance of experimental group 3 is best, indicating that when the ratio of the copolymerized modified PLA:the PHBV:the nano $SiO_2$:the compatibilizer: the chain extender in the melt-blown blend is 80:1:0.2: 0.003:0.01, the filtration performance of the non-woven fabric is the best.

In an example, the electret treated non-woven fabric in each group is heated and water immersed at room temperature, and the charge strength and filtration efficiency are not reduced, indicating that the filtration efficiency does not decay over time.

After testing, take the electret treated non-woven fabric in this example and increase the number of superimposed layers from 1 to 3, the particle filtration efficiency has increased from 90% to 99.99%, which can fully meet the level 3 standard of a medical mask. The number of superimposed layers is increased from 1 to 3, when the gas flow rate is 85 L/min, the airflow resistance is increased from 78.6 Pa to 247.1 Pa, which conforms to the inhalation resistance of medical masks not to exceed 343.2 Pa (35 mm $H_2O$). It can be seen from the result that the filtration efficiency can be increased by superimposing the number of layers of the non-woven fabric obtained by the electret treatment in this example.

Example 2

This example also provides an application of a fully degradable non-woven fabric in Example 1 in a preparation of a medical mask, that is, the fully degradable non-woven fabric in Example 1 is used to prepare the medical mask, and a medical surgical mask may have several layers, of which an innermost layer and an outermost layer are made of a non-woven fabric, with at least one layer of a non-woven fabric produced by the melt-blown method in Example 1 as a filter layer in the middle.

In an example, a performance evaluation of the medical mask is performed according to following standards.

1. Filtration Efficiency

When the gas flow rate is 85 L/min, the filtration efficiency of the medical mask for non-oily particles should meet requirements of Table 14.

TABLE 14

Classification of filter efficiency levels for non-oily particles by the medical mask

| Level grade | Filtration efficiency (%) |
|---|---|
| Level 1 | ≥95 |
| Level 2 | ≥99 |
| Level 3 | ≥99.97 |

2. Airflow Resistance

When the gas flow rate is 85 L/min, the inhalation resistance of the medical mask shall not exceed 343.2 Pa (35 mm $H_2O$).

3. Synthetic Blood Penetration

Spray 2 mL of synthetic blood to the medical mask at 10.7 kPa (80 mm Hg) pressure, and there should be no penetration inside the medical mask.

4. Surface Moisture Resistance

The moisture level on an out surface of the medical mask should not be lower than the level 3 stipulated in GB/T 4745-1997, that is, only a small unconnected area on the surface is wet.

5. Flame Retardant Performance

The materials used should not be flammable, and the continuous burning time should not exceed 5 s.

6. Skin Irritation

The primary irritation score of the medical mask material should not exceed 1.

7. Tightness

The medical mask design should provide good tightness, and a total fit factor of the medical mask should not be less than 100.

After testing, the performance of the medical mask in this example all meets the requirements.

In summary, production materials of the non-woven fabric in this application, such as PLA, PHBV, nano $SiO_2$, compatibilizer, chain extender, etc., are all fully degradable materials, and the non-woven fabric finally obtained can be fully degraded. The fully degradable non-woven fabric is used to make a medical consumable such as the medical mask, which will not pollute the environment after being used and discarded. At the same time, this application modifies the PLA multiple times in a gradient, that is, the PLA is first modified by copolymerization with ε-caprolactone, and a resulting product is then mixed with the PHBV, the nano $SiO_2$, the compatibilizer and the chain extender for blending modification and chain extension modification to change a structure of PLA polylactic acid, thereby changing the polymer properties. In addition, ultrasonic/microwave treatment and electret treatment are added during the modification process, and various melt-blown parameters (such as receiving distance, hot air temperature, extrusion frequency, etc.) are optimized to make performance indicators of the non-woven fabric finally obtained improve, such as improving mechanical properties, increasing an air permeability, a fiber strength and a filtration efficiency, so that it can meet quality standards of the medical mask and other consumables.

In the case of no conflict, the examples and the features in the examples in this application can be combined with each other.

The above are only preferred embodiments of the present disclosure and are not intended to limit the present disclosure. It should be understood that any modifications, replacements and improvement made by those skilled in the art without departing from the spirit and scope of the present disclosure shall fall within the scope of the present disclosure.

What is claimed is:

1. A fully degradable non-woven fabric produced by melt-blown extrusion, wherein the fully degradable non-woven fabric is prepared through steps:

(S1) adding lactic acid (L-LA) and ε-caprolactone (ε-CL) into a reaction vessel to obtain a reaction system, wherein a weight ratio of the lactic acid (L-LA) to the ε-caprolactone (ε-CL) in the reaction system is 1:(2-4);

adding a catalyst to the reaction system followed by reaction at 130-140° C. under vacuum for 18-24 hours to obtain a crude copolymerization product; wherein the catalyst is 0.1-0.2% of a total weight of the reaction system; and purifying the crude copolymerization product to obtain a caprolactone-lactic acid random copolymer P (CL-co-LA);

(S2) drying polylactic acid (PLA);

mixing a dried PLA and the P(CL-co-LA) uniformly followed by melt blending at a temperature of 180-190° C. and a rotation speed of 50-100 r/min to obtain a blend; wherein a weight ratio of PLA to P (CL-co-LA) is (9-99):1, and the melt blending is performed for 5-10 min; and subjecting the blend to compression molding at 180-190° C. and 8-10 MPa to obtain a copolymerized modified PLA finally; and (S3) subjecting the copolymerized modified PLA, poly (3-hydroxybutyrate-co-3-hydroxyvalerat) (PHBV), nano $SiO_2$, a compatibilizer, and a chain extender to blending obtain a melt-blown blend; wherein a weight ratio of the copolymerized modified PLA to the PHBV to the nano $SiO_2$ to the compatibilizer to the chain extender is (80-95):(1-5):(0.1-0.2):(0.001-0.005):(0.001-0.01); wherein the compatibilizer is a combination of maleic anhydride, butyric anhydride, stearic anhydride, and tannic acid in a weight ratio of 1:1:1:1;

feeding the melt-blown blend to a screw extruder followed by melt-extrusion and pelletization at 160-200° C. to obtain a blend pellet; and feeding the blend pellet to the screw extruder followed by melt-extrusion and plasticization to obtain a melt-extrusion product; and transporting the melt-extrusion product to a spinneret assembly, and ejecting the melt-extrusion product from a hole of a spinneret of the spinneret assembly followed by cooling and pulling using hot air flow to form a melt-blown non-woven material on a collecting device, and subjecting the melt-blown non-woven material to electret treatment to obtain the fully degradable non-woven fabric.

2. The fully degradable non-woven fabric of claim 1, wherein in the step (S1), the crude copolymerization product is purified through steps of:

(S11) subjecting the crude copolymerization product to ultrasonic treatment and/or microwave treatment followed by precipitation with ethanol with a volume fraction of 90%; and (S12) repeating the step (S11) 1-2 times to obtain a purified copolymerization product.

3. The fully degradable non-woven fabric of claim 2, wherein the ultrasonic treatment is performed at an ultrasonic power of 200-300 W for 1-1.5 h; and the microwave treatment is performed at a microwave power of 200-300 W for 0.5-1 h.

4. The fully degradable non-woven fabric of claim 1, wherein in the step (S3), a distance from the hole of the spinneret of the spinneret assembly to the collecting device is 30-50 cm; an extrusion frequency of the hole of the spinneret is 1.5 Hz-2.5 Hz; and a temperature of the hot air flow is 240-260° C.

5. The fully degradable non-woven fabric of claim 1, wherein in the step (S2), a melt index of the PLA at 210° C. is 20-40 g/10 min.

6. The fully degradable non-woven fabric of claim 1, wherein in the step (S3), an electret material used in the electret treatment is obtained by corona electret; and the electret treatment is performed at an electret voltage of 30-40 kV and an electret distance of 2-4 cm for 1-2 min.

7. The fully degradable non-woven fabric of claim 1, wherein in the step (S3), the copolymerized modified PLA is sliced and dried at 60° C. for 24-48 h before blending.

* * * * *